United States Patent
Ryan

(10) Patent No.: US 6,522,694 B1
(45) Date of Patent: Feb. 18, 2003

(54) PROGRAMMABLE FILTER FOR REMOVING STUFFING BITS FROM AN MPEG-2 BIT-STREAM

(75) Inventor: Robert T. Ryan, Langhorne, PA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/169,791

(22) Filed: Oct. 9, 1998

(51) Int. Cl.$^7$ ................................................. H04N 7/12
(52) U.S. Cl. ................................................. 375/240.25
(58) Field of Search ........................ 375/240.25, 240.26, 375/240.27, 240.28, 240.29; 348/425.1, 425.2, 425.3, 425.4

(56) References Cited

U.S. PATENT DOCUMENTS

| | | | | |
|---|---|---|---|---|
| 5,650,825 A | * | 7/1997 | Naimpally et al. | 348/465 |
| 5,727,036 A | * | 3/1998 | Maertens | 370/305 |
| 5,734,429 A | * | 3/1998 | Jung | 348/461 |
| 5,754,128 A | * | 5/1998 | Kang | 341/67 |
| 5,812,760 A | * | 9/1998 | Mendenhall et al. | 348/467 |
| 5,821,886 A | * | 10/1998 | Son | 341/67 |
| 5,828,426 A | * | 10/1998 | Yu | 348/441 |
| 5,898,897 A | * | 4/1999 | Son et al. | 710/68 |
| 6,014,171 A | * | 1/2000 | Koyanagi et al. | 348/402 |
| 6,061,495 A | * | 5/2000 | Yanagihara et al. | 386/111 |
| 6,185,339 B1 | * | 2/2001 | Ozaki | 382/232 |
| 6,219,067 B1 | * | 4/2001 | Dieterich | 345/440 |

FOREIGN PATENT DOCUMENTS

| | | | |
|---|---|---|---|
| EP | 0735776 A2 | 10/1996 | H04N/7/50 |
| EP | 0602621 A | 10/2000 | H04N/7/13 |
| JP | 08 181988 | 7/1996 | H04N/7/30 |

OTHER PUBLICATIONS

Jill Boyce et al. SDTV Receivers with HDTV Decoding Capability Feb. 1995, ACATS Technical Subgroup Meeting, May 1995, Washington DC.
Jill Boyce et al. Low–Cost All Format ATV Decoding with Improved Quality, Hitachi America, Ltd, Princeton, N.J., 30th SMPTE Advanced Motion Imaging Conference, Paper #11, Feb. 2, 1996.
Jack S. Fuhrer, The All Format Decoder, Hitachi America, Ltd. Jun. 3, 1996.
Recommended Practices for Video Encoding Using the ATSC Digital Televion Standard—Consideration of Downsampling Decoders, SMPTE Jun. 6, 1996.
Discussion on Recommended Practices for North American ATV Video Coding—Consideration of Downsampling Decoders, Hitachi 5/96.

* cited by examiner

Primary Examiner—Vu Le
(74) Attorney, Agent, or Firm—RatnerPrestia

(57) ABSTRACT

An MPEG-2 video decoder which identifies and removes stuffing data from an MPEG-2 bit-stream before storing the bit-stream into the VBV buffer of the decoder. The decoder monitors the MPEG-2 bit-stream for successive groups of zero-valued bytes. When a sequence of successive of zero-valued bytes is encountered that is greater than a programmed maximum length the decoder identifies the sequence as stuffing data and inhibits any further zero-valued bytes from being passed until the next non-zero valued byte is encountered. The decoder specifies two maximum length values, one for the number of stuffing bytes which may precede a Slice start code and the other for the number of stuffing bytes which may precede a non-Slice code. These values may be changed during the decoding operation by a microprocessor.

7 Claims, 6 Drawing Sheets

PROGRAMMABLE FILTER FOR REMOVING STUFFING BITS FROM AN MPEG-2 BIT-STREAM

BACKGROUND OF THE INVENTION

The present invention relates to decoders for processing image data which has been compressed according to a format, MPEG-2, specified by the moving pictures experts group (MPEG) and in particular to a preprocessing step which selectively deletes stuffing bits from the MPEG-2 data stream prior to decoding.

Video signal compression performed under the MPEG-2 standard is inherently variable rate. Video data is compressed based on the spatial frequency content of either a sequence of images or the difference among the images in the sequence. If an image sequence has low spatial frequency content or if successive images differ only slightly, the amount of compressed data that is transmitted to reproduce the image sequence may be greatly reduced.

The syntax for the MPEG-2 standard is set forth in International Standard 13818-2 Recommendation ITU-T H.262 entitled "Generic Coding of Moving Pictures and Associated Audio Information: Video," available from ISO/IEC, Geneva, Switzerland, and which is incorporated herein by reference for its teaching of the MPEG-2 video coding standard. This standard defines several layers of data records which are used to convey both audio and video data. For the sake of simplicity, the decoding of the audio data is not described herein. Encoded data which describes a particular video sequence is represented in several nested layers, the Sequence layer, the Group of Pictures layer, the Picture layer, the Slice layer and the Macroblock layer. Each layer, except the Macroblock layer, begins with a start code that identifies the layer. The layer includes header data and payload data. To aid in transmitting this information, a digital data stream representing multiple video sequences is divided into several smaller units and each of these units is encapsulated into a respective packetized elementary stream (PES) packet. For transmission, each PES packet is divided, in turn, among a plurality of fixed-length transport packets. Each transport packet contains data relating to only one PES packet. The transport packet also includes a header which holds control information, sometimes including an adaptation field, to be used in decoding the transport packet.

When an MPEG-2 encoded image sequence is received, a transport decoder decodes the transport packets to reassemble the PES packets. The PES packets, in turn, are decoded to reassemble the MPEG-2 bit-stream which represents the image in the layered records, as described above. A given transport data stream may simultaneously convey multiple image sequences, for example as interleaved transport packets. This flexibility also allows the transmitter to concurrently transmit multiple bit-streams, each corresponding to a respective audio, video or data program.

A system implementation for delivering HDTV using MPEG-2 standards to the consumer, in general, as illustrated in high-level block diagram of FIG. 1. On the transmission side, video and audio signals are input to respective encoders 110 and 112, buffered in buffers 114 and 116, delivered to the system coder/multiplexer 118, and stored in storage unit 120 or transmitted by transmitter unit 120. On the receiving side, the signals are received by a system decoder/demultiplexer, 122, buffered in buffers 124 and 126, then decoded by decoders 128 and 130 and output as a reproduction of the original video and audio signals.

An important aspect of the illustration of FIG. 1 is that, although the intermediate stage buffering of the signals includes a variable delay, the overall delay from input to output of the signals is desirably substantially constant. This is accomplished by monitored flow control and buffers.

As indicated in FIG. 1, the delay from the input to the encoder to the output or presentation from the decoder is constant in this model, while the delay through each of the encoder and decoder buffers is variable. Not only is the delay through each of these buffers variable within the path of one elementary stream, the individual buffer delays in the video and audio paths differ as well. Therefore, the relative location of coded bits representing audio or video in the combined stream does not indicate synchronization information. The relative location of coded audio and video is constrained only by a System Target Decoder (STD) model such that the decoder buffers must behave properly; therefore, coded audio and video that represent sound and pictures which are to be presented simultaneously may be separated in time within the coded bit system by as much as one second, which is the maximum decoder buffer delay that is allowed in the STD model. In order to accommodate the data latency inherent in the STD model, a Video Buffering Verifier (VBV) is defined.

The VBV is a hypothetical decoder, which is conceptually connected to the output of an encoder. An encoded bit-stream is stored into a VBV buffer memory of the hypothetical decoder until a sufficient amount of data has been stored to ensure that a decoder decoding the bit-stream will not run out of data (underflow) or process data too slowly (overflow) when the data is received at a fixed rate. Coded data is removed from the buffer as defined below. To conform to the MPEG-2 standard, a typical MPEG-2 video decoder includes a memory buffer, the VBV buffer, which holds an amount of bit-stream data specified by a value, vbv_buffer_size_value which is transmitted as a part of the header of the Sequence layer.

A high-level illustration of an exemplary STD model operating in conjunction with an encoder is shown in FIG. 2.

The requirement that the VBV buffer or STD model decoders not underflow is important to maintain the quality of the received image. In order to maintain constant bitrate video, "stuffing" is implemented within various aspects of the system. "Stuffing" is the act of filling the data stream with "don't care" information simply to maintain the required bit-rate.

Stuffing is implemented at two levels. In the MPEG-2 video standard, any number of zero-valued stuffing bits may be inserted into the bit stream immediately before a start code for one of the layers or before an extension start code. Stuffing is also implemented in the transport packets as one-valued stuffing bits inserted into an adaptation field in the transport packet. Stuffing is used in transport packets when there is insufficient PES packet data to fill the payload bytes of the transport packet to a level that would support the transmitted data rate.

It has been recognized for some time that the stuffing bits represent wasted bandwidth in the MPEG-2 signal which could be used for other purposes. For example, in U.S. Pat. No. 5,650,825, entitled METHOD AND APPARATUS FOR SENDING PRIVATE DATA INSTEAD OF STUFFING BITS IN AN MPEG BIT STREAM, stuffing data in adaptation fields of transport packets is replaced by private stuff data which is received and separately processed by a user.

SUMMARY OF THE INVENTION

The present invention is embodied in an MPEG-2 decoder which identifies and removes stuffing data from an MPEG-2 bit-stream before storing the bit-stream into the VBV buffer.

According to one aspect of the invention, the decoder includes a bit-stream parser which passes a predetermined maximum number of stuffing bits before each start code.

According to another aspect of the invention, the parser passes different numbers of stuffing bits to be posed before a start code before Slice start codes and other start codes.

According to yet another aspect of the invention, a value indicating the number of stuffing bits passed is provided to the parser by a microprocessor and may be programmed.

DETAILED DESCRIPTION

Figure 3:
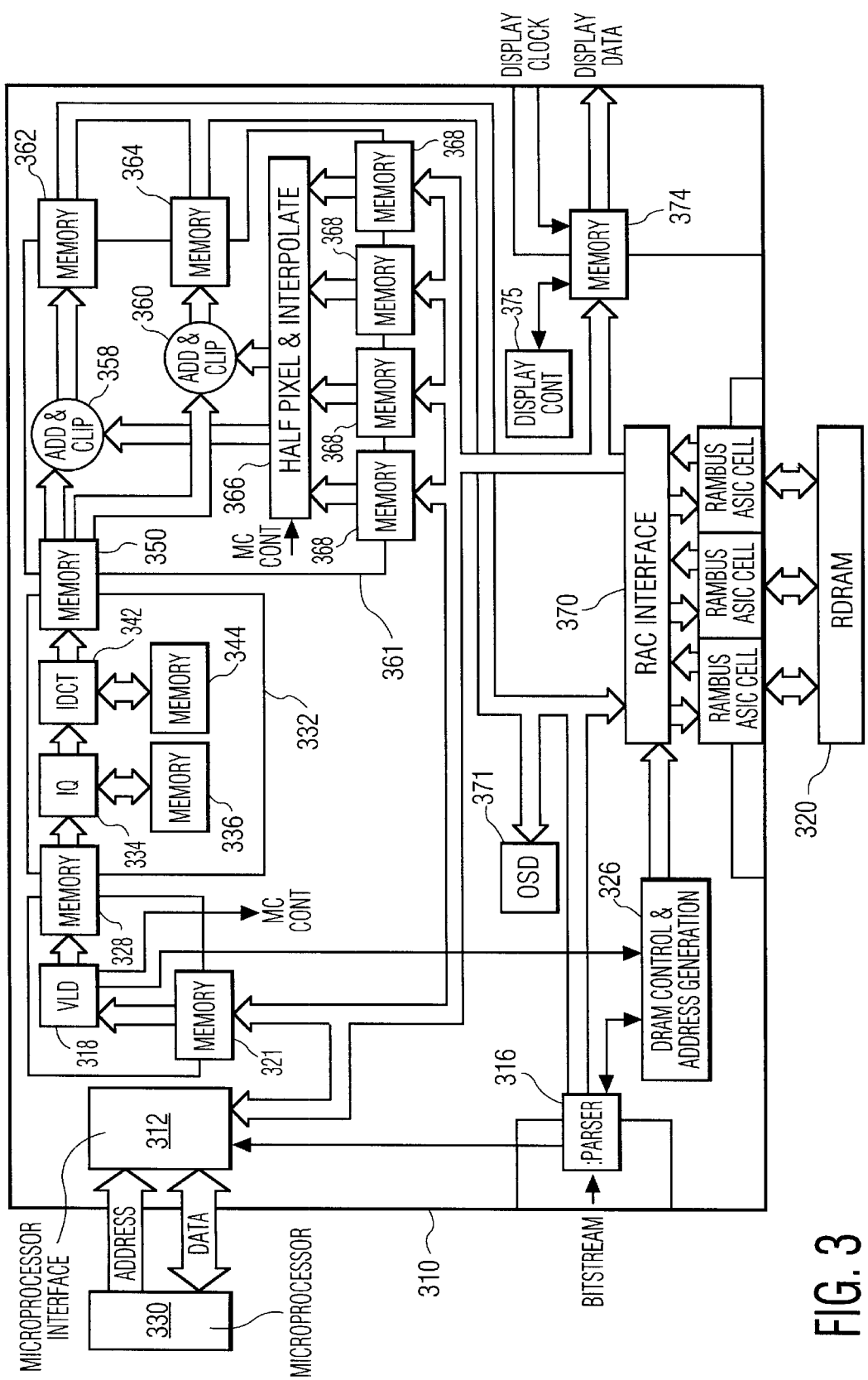
FIG. 3 is a block diagram of an MPEG-2 video decoder which includes an embodiment of the present invention.

FIG. 3 is a block diagram of an exemplary decoder system which embodies the present invention. This system includes three components, a decoding processor 310 a high-bandwidth memory 320 and a control microprocessor 330. The high-bandwidth memory 320 used in the exemplary embodiment of the invention may be, for example, a RAMBUS memory system which is available from NEC and Toshiba.

Briefly, the decoder shown in FIG. 3 operates as follows. As a first step, the decoder integrated circuit (IC) 310 is initialized by the microprocessor 330 in a particular configuration. If, for example, the decoder is to be used to decode 525P signals, the appropriate control values are applied to the internal circuitry of the decoding processor 310 via the microprocessor interface 312. For the sake of clarity, the control bus between the microprocessor 330 and each of the elements in the IC 310 has been omitted. This bus may be, for example, a conventional I²C bus.

Once the IC 310 has been initialized, the input bit-stream is applied to a parser 316. The parser, described below with reference to FIG. 4, stores the bit-stream in the memory 320. In addition, the parser identifies start codes for PES packets the Sequence, Group of Pictures, Picture and Slice layers and notifies the microprocessor 330 of the memory locations at which these start codes are stored. In the exemplary decoder shown in FIG. 3, the microprocessor decodes at least some of the header information for these layers.

The DRAM control and address generator 326, controls the RAC interface 370 to store the bit-stream data into the memory 320. In the exemplary embodiment of the invention, a portion of the memory 120 is reserved for use as a buffer to hold the input bit-stream. This buffer area corresponds to the VBV buffer which is specified in the MPEG-2 standard to hold bit-stream data before it is decoded.

According to the MPEG-2 standard, before decoding may begin, the VBV buffer must hold an amount of data specified in the value, vbv_buffer_size_value of the Sequence header of the bit stream. This constraint ensures that there is a steady supply of data to the decoder.

After the bit-stream data is written into the VBV buffer area of memory 320, it is read from the high-bandwidth memory 320 and stored in the buffer memory 321, also under control of the DRAM control and address generation circuitry 326. The memory 321 is a FIFO memory which is filled in bursts from the memory 320 and emptied by the variable length decoder (VLD) 318 as dictated by the bit-stream syntax.

The VLD 318 parses the Slice and Macroblock layers of the bit-stream to generate blocks of quantized discrete cosine transform coefficient values. These blocks of values are applied a FIFO memory 128. This FIFO memory buffers the data between the VLD 318 on the one hand and the Macroblock decoding circuitry 332 on the other hand. This memory may also perform the inverse scan function defined in the MPEG-2 standard. The circuitry 332 includes an inverse quantizer 334 which converts the quantized coefficient values into a uniform format and an inverse discrete cosine (IDCT) processor converts the frequency domain coefficients into spatial domain pixel values or differential pixel values. The inverse quantizer 334 and IDCT processor 342 include respective memories 336 and 344 to aid in the processing operations. The output data provided by the circuitry 332 are blocks of pixel values or differential pixel values.

Where the values in the blocks are differential pixel values, they are combined with values from previously decoded image frames by a motion compensation processor 361 which includes add and clip circuitry 358 and 360. These circuits, in turn, obtain the image data from the previously decoded frames, which are provided by the half pixel and interpolation circuitry 366. The interpolation circuitry 366 obtains the image pixels from the previously decoded frames using buffer memories 368. Data values for these memories are provided from the memory 320 by the DRAM control and address generation circuitry 326.

The decoded image data produced by motion compensation processor 361 is stored into buffer memories 362 and 364. From the buffer memories 362 and 364 the decoded image data is stored into the memory 320 for display or for use as reference frame data in decoding motion compensated encoded data from later received image fields or frames. Data to be displayed is stored into the memory 320 in block format and transferred to a memory 374 to be provided to a display device (not shown) in raster scan format under control of a display controller 375.

An on-screen display (OSD) processor 371 is also coupled to provide data to, and receive data from the memory 320 via the DRAM control and address generator 326 and RAC interface 370. In the exemplary embodiment of the invention, the OSD processor 371 is used to generate user menus and close-caption text which overlay the displayed image.

As shown in FIG. 3, the memory 320 receives data from the parser 316, the microprocessor 330, the motion compensation processor 361 and the OSD processor 371 and provides data to the VLD 318, the motion compensation processor 361, the OSD processor 371 and the display controller 375. Furthermore, the memory 320 is dynamic random access memory (DRAM) and, so, periodically needs to be refreshed, requiring further memory accesses. Each of these memory accesses is prioritized with the display processor 375 having the highest priority and the OSD processor 371 having the lowest priority.

Depending on the image sequence being processed, it may be difficult to schedule all of the memory access requests that are pending at any given time. In these instances, the lower priority memory access requests are delayed. Image sequences which are encoded in a relatively small number of bits may have an unexpectedly high level of memory access requests. These requests are generated by the VLD processor 318 because much of the bit-stream data which is received of the memory 320 is stuffing bits that are ignored by the VLD. These excess requests for bit-stream data made by the VLD 318 deprive lower priority devices of opportunities to access data in the memory 320.

The present invention reduces the number of memory accesses by the VLD processor 318 when decoding image sequences of this type by greatly reducing the number of stuffing bits that are stored in the memory 320. This reduction in the bit-stream data that is stored in memory does not violate the VBV buffer constraints because, under the STD model, the decoding of a sequence of stuffing bits is assumed to take no time.

Figure 4:
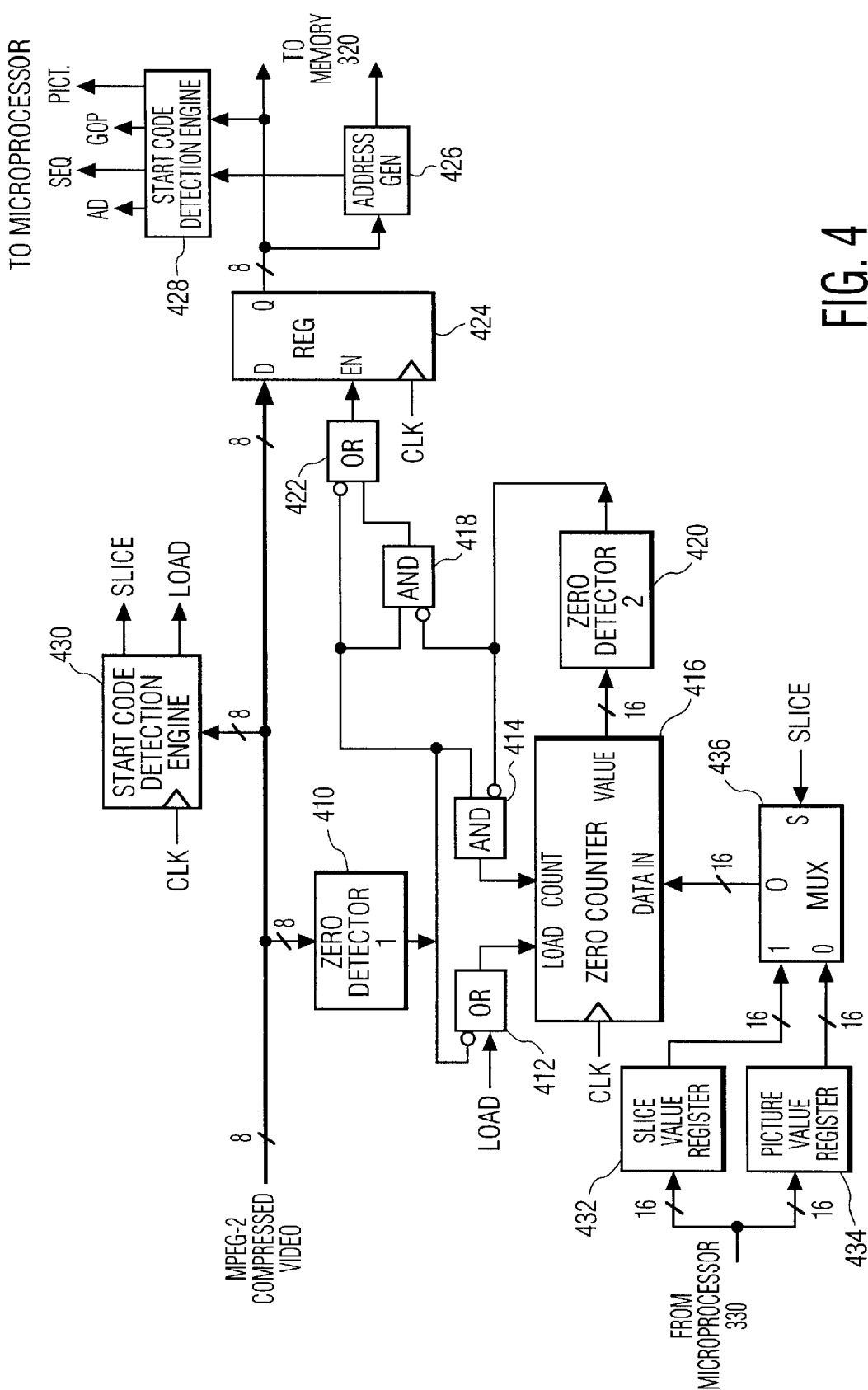
FIG. 4 is a block diagram of a parser suitable for use in the decoder shown in FIG. 3.

FIG. 4 is a block diagram of an exemplary bit-stream parsing circuit suitable for use as the parser 316 shown in FIG. 3. In general, the circuit operates as follows. When a start-code or a non-zero byte is detected in the input bit-stream, a value is loaded into the counter 416. This value indicates a number of zeros that will be passed by the parser to the VBV buffer in the memory 320. As described above, zero-valued stuffing bits are inserted into the bit-stream before the start codes for the PES, Sequence, Group of Pictures, Picture, and Slice layers. In addition, stuffing bits may also be inserted prior to the Extension data in any of the Sequence, Group of Pictures or Picture layers. The counter 416 of the parser shown in FIG. 4 is set to the appropriate number of stuffing bytes to pass at the end of one of these layers. This number of bytes is counted down between the end code of one record and the start code of the next record. After the counter value has counted down to zero, no further zero-valued bytes are transferred to the VBV buffer until another start code or non-zero byte is encountered in the bit-stream. The counter 416 is reset to a non-zero value as soon as a start code value is detected, ensuring that the start code data and the data in the record which begins with the start code is passed to the VBV buffer. Because the number of stored stuffing bytes is decreased, the number of memory accesses needed by the VLD processor 318 and microprocessor 330 (shown in FIG. 3) are also decreased. This reduces the total number of accesses to the memory 320, allowing lower priority memory accesses to occur in a more timely manner. The number of stuffing bytes stored after a Slice record may be different than the number stored after other types of records and these numbers may be programmed into the microprocessor.

In FIG. 4, the compressed MPEG-2 bit-stream is received one byte at a time coincident with successive pulses of the signal CLK. Successive bytes of the bit stream are applied to a zero detector 410, a register 424 and a start code detection engine 430. The zero detector 410 detects when all 8-bits of a given byte are zero to provide a logic-high signal. This signal is applied to the inverting input terminals of OR gates 412 and 422 and to non-inverting input terminals of AND gates 414 and 418. The other input terminal of the OR gate 412 is coupled to receive an output signal LOAD from the start code detection engine 430. The output signal of the OR gate 412 is applied to the LOAD input terminal of the counter 416. When this signal is asserted, the counter 416 loads a count value provided by a multiplexer 436. The multiplexer 436, in turn, receives an allowable number of stuffing bytes that may occur before a Slice start code from a register 432 and a number of allowable stuffing bytes that may occur before other start codes from a register 434. Values are stored into the registers 432 and 434 by the microprocessor 330.

Counter 416 counts down from the stored value to zero responsive to a signal provided by the AND gate 414. The 16-bit count value provided by counter 416 is applied to a zero detector 420 which asserts a logic-high signal when the count value reaches zero. And gate 414 is coupled to receive the output signal of the zero detector 410 at one input terminal and the inverse of the output signal of the zero detector 420 at its other input terminal. Thus, counter 416 decrements its count value as long as a zero-valued byte is received and the count value is not zero.

The output signal of the zero detector 420 is also applied to an inverting input terminal of the AND gate 418, the other input terminal of which is coupled to receive the output signal of the zero detector 410. The output signal of the AND gate 418 is logic-high whenever a zero-valued byte is received and the counter 416 has not counted down to zero. This output signal is applied to a non-inverting input terminal of the OR gate 422. The OR gate 422 produces a logic-high output signal whenever the output signal of the AND gate 418 is logic-high or when the output signal of the zero detector 410 is logic-low. The output signal of the OR gate 422 is applied to the enable input terminal of a D-type register 424. The register 424 is controlled by the signal CLK to pass an 8-bit input value from its input port to its output port and on to the memory 320, responsive to the signal CLK but only when a logic-high value is applied to the enable input terminal. Thus, a logic-low signal applied to the enable input terminal inhibits the passage of data from the received bit-stream to the memory 320.

The start code detection engine 430 processes successive bytes of the MPEG-2 bit-stream to identify start codes and, in particular, to identify start codes for the Slice layer. A start code consists of a start code prefix followed by a start code value. The start code prefix is a sequence of 23 zero-valued bits followed by a single one-valued bit. The start code value is a single byte. Under the MPEG-2 standard, a Slice start code may have any value from 0x01 through 0xAF. Thus, when the exemplary start code detection engine detects a start-code prefix and a Slice start code value, it asserts the signals LOAD and SLICE. When it detects any other start code value, it asserts only the signal LOAD. The signal SLICE provided by the start code detection engine 430 is applied to the multiplexer 436 and causes the multiplexer to pass the number of stuffing bytes appropriate for a Slice start code to the counter 416. When the signal SLICE is not asserted, the number of stuffing bytes stored in the register 434 is loaded into the counter 416.

Also coupled to receive the output signal of the register 424 are an address generator 426 and a start code detection engine 428. The start code engine 428 detects start codes for PES Packets, the Sequence, Group of Pictures, Picture and Slice layers. The address generator 426 provides an address value for the memory 320 into which the data provided by the register 424 is to be stored. The start code detection engine 428 passes this address value along with an indication that the detected start code is for a PES packet, Sequence, Group of Pictures, Picture, or Slice to the microprocessor 330. As described above, the microprocessor 330 uses this information to fetch the headers for these records from the memory 320 and decode the fetched header data.

As described above, the MPEG-2 standard defines 5 layers of information for a sequence of images. These are the Sequence layer, the Group of Pictures layer, the Picture layer, the Slice layer and the Macroblock layer. FIGS. 5A through 5F are syntax diagrams which illustrate the structure of these layers.

These various layers are defined in the above-referenced document which describes the MPEG-2 standard. Briefly, the Sequence layer includes the other four layers. The layers referred to are layers of data records. Thus, a Sequence record includes at least one Group of Pictures records which, in turn, include at least one Picture record and so on, down to the Macroblock layer. The Sequence layer defines the starting point of a set of images which can be decoded based only on the information following the start of the Sequence. The next lower layer, the Group of Pictures layer, defines a subset of the images contained in the Sequence. The images in the Group of Pictures layer generally include at least one image which has been encoded using only data in the image (an intra-encoded image) and several images which have been encoded using motion-prediction encoding techniques (predictively or bidirectionally encoded images). Immediately below the Group of Pictures layer is the Picture layer. The data records at this layer define single frame images. Below the Picture layer is the Slice layer. Each record at this layer represents a single horizontal segment of the image represented by the Picture layer record. Below the Slice layer is the Macroblock layer. Each record in this layer defines a 16 pixel by 16 pixel component of the Slice record in which it occurs.

Figure 5A:
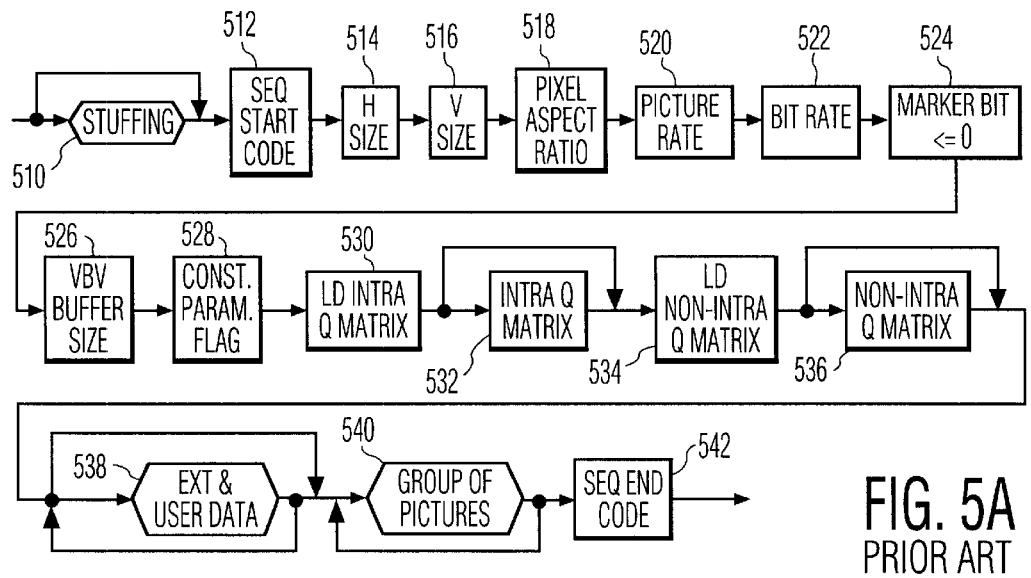
FIGS. 5A through 5F (prior art) are syntax diagrams of the MPEG-2 bit-stream which are useful for describing the operation of the subject invention.

FIG. 5A defines the syntax of the Sequence layer. In the MPEG-2 description, a Sequence is defined by a Sequence start code followed by a set of parameters to be used for the Sequence, data for one or more Groups of Pictures and a Sequence end code. Among the parameters that may be provided are quantization matrices which define how the coefficients in the individual blocks were quantized during the encoding process.

Figure 1:
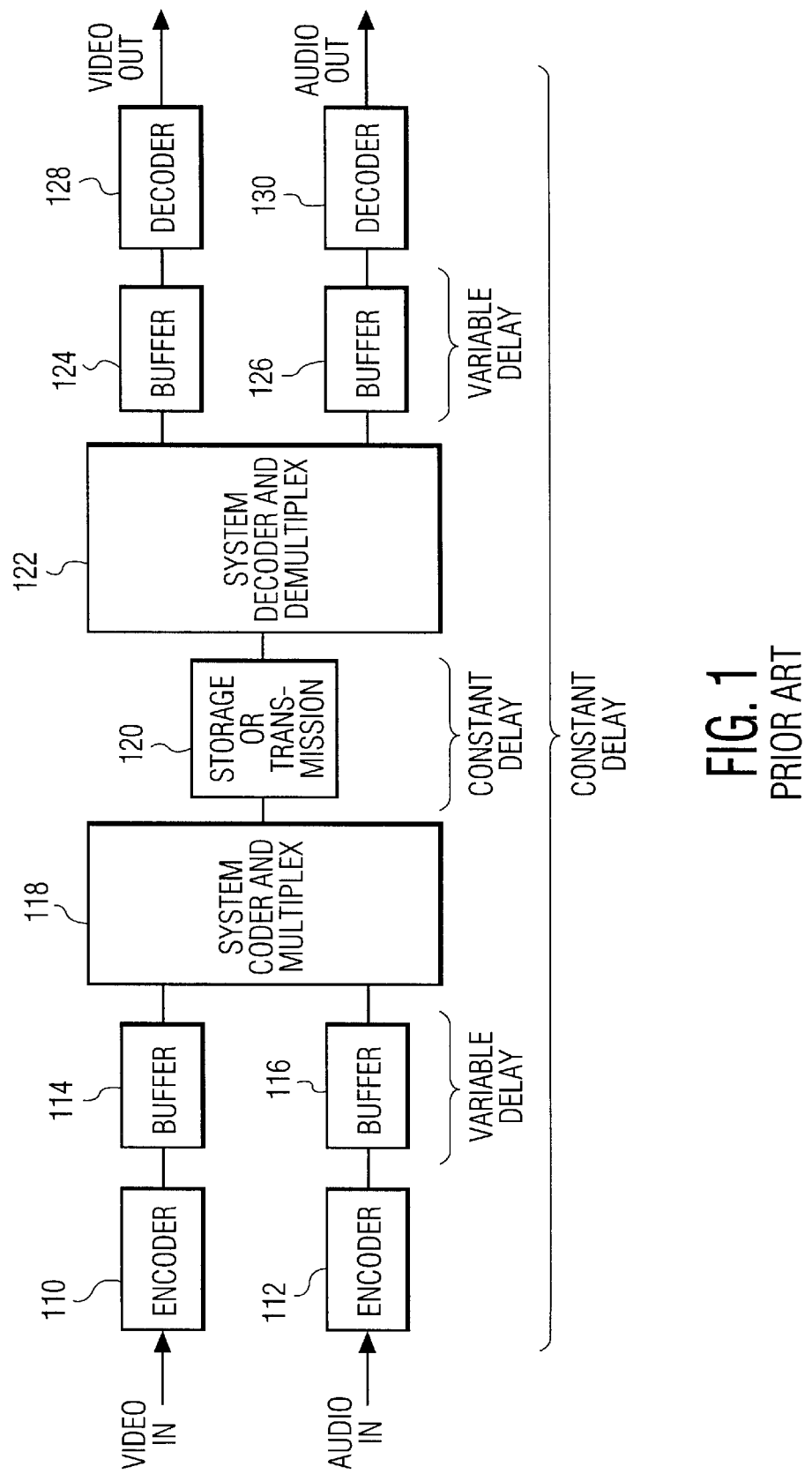
FIG. 1 (prior art) is a high-level block diagram of an exemplary digital multi-program transmission and receiving system.
Figure 2:
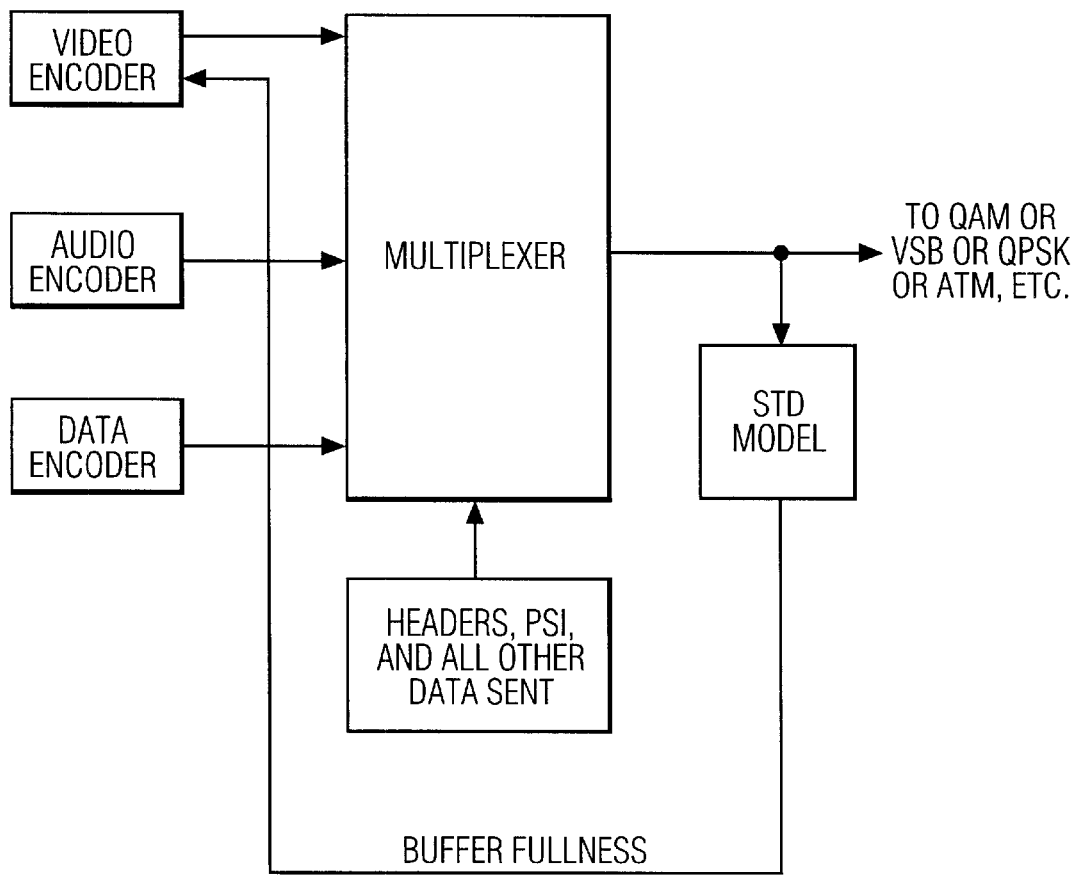
FIG. 2 (prior art) is a high-level block diagram of an exemplary implementation of a STD model in the system shown in FIG. 1.

As described above, the stuffing entry 510 in the sequence syntax shown in FIG. 5A, represents a zero fill operation which may be performed to conform the timing of the bit stream to the display of the video image. If, for example, the preceding sequence contained several frames which could be efficiently encoded, the bit stream may need to be padded to meet the fixed delay requirements between the transmitter and the receiver, as described above with reference to FIG. 1. In the MPEG-2 standard, one type of padding may be to stuff zero-valued bits into the bit-stream, after the sequence end code of the preceding sequence and before the sequence start code of the next sequence. As indicated by the arrow bridging step 510, the stuffing operation is optional in the Sequence syntax.

The next item in the Sequence syntax is the Sequence start code 512. This is defined under the MPEG-2 standard as being 0x000001B3 (hexadecimal notation). All start codes begin with at least 23 zero-valued bits and a single one-valued bit. The start code value follows the 23 zeros and the single one and determines the type of start code. Table 1 lists start code values which are relevant to the subject invention.

TABLE 1

| Start Code | Hexadecimal Value |
| --- | --- |
| Picture | 0x00 |
| Slice (including vertical position) | 0x01 through 0xAF |

TABLE 1-continued

| Start Code | Hexadecimal Value |
| --- | --- |
| Sequence | 0XB3 |
| Group of Pictures | 0xB8 |
| PES packet | 0xE0 through 0xEF |

In addition to these start codes, the Sequence, record ends with an end code that has the same general format as a start code.

Following the Sequence start code, the first parameter to be defined for the Sequence is the horizontal size 514. This value defines a number of picture elements (pixels) in each line of the decoded video image. Following the horizontal size parameter is the vertical size parameter 516. This parameter defines the number of active lines in the decoded video image. The pixel aspect ratio 518 defines the aspect ratio of the decoded high definition television image.

The next item in the syntax, the picture rate 520 defines the number of pictures per second that will be displayed. This ranges from approximately 24 pictures per second to 60 pictures per second. The bit rate parameter 522 is an integer which defines the bit rate of the bit stream measured in units of 400 bits per second. The next item in the syntax is the marker bit 524. This bit always has a value of 1. The vbv_buffer_size parameter 526 is a 10 bit integer which, as described above, defines the size of the buffer for the video buffering verifier which is needed to decode this sequence.

When the next parameter, the constrained parameter flag 528 is set, certain default maximum parameter sizes are assumed under the MPEG-2 standard. This flag is reset for most HDTV images because the limitations defined when the flag is set correspond roughly to the resolution of an NTSC or PAL image.

Following the constrained parameter flag 528 is the load-intra-quantization-matrix flag 530. If this flag is set then the following 64 eight-bit values in the sequence parameter stream define a quantization matrix to be used for decoding intraframe encoded images. These 64 values are represented by the item 532 in the sequence syntax shown in FIG. 5A. If the intra quantization matrix flag 530 is reset, then a default quantization matrix is used for decoding intra-encoded images. This default matrix is defined in the MPEG-2 standard.

The next item in the sequence syntax is the load non-intra quantization matrix flag 534. This flag operates in the same manner as the load intra quantization matrix flag, except that, when the flag is set, the 64 eight-bit values 536 following the flag are used for dequantizing pictures that have been bidirectionally or predictively encoded.

The item in the sequence syntax following the non-intra quantization matrix is the extension and user data 538. Extension data is defined by a start code value of 0xB5. The extension data follows this code and continues until another start code is encountered. One start code which may be encountered is the user data start code. In the MPEG-2 the user data start code value is 0xB2. This code identifies the beginning of user data. As with the extension data, this data continues until the receipt of another start code. The extension and user data is provided to allow for expansion and customization of the MPEG-2 standard. As indicated by the arrow bridging block 538, this data is optional.

After the extension and user data 538 are one or more Group of Pictures records 540. As shown by the backwards arrow bridging item 540 in the syntax diagram, multiple Groups of Pictures may be defined in this part of the Sequence syntax. Following the final Group of Pictures, however, is a Sequence End Code 542. This code is defined by the end-code value 0xB7.

Unless the format of the data transmission is well known, decoding may only begin after a Sequence Start Code, and its accompanying parameters, have been encountered in the data stream. To prevent long delays between Sequence headers, it is contemplated in the MPEG-2 standard that these start codes and their associated header blocks may be inserted multiple times in a given Sequence. These header blocks may be inserted, for example, between successive Group of Pictures records. As defined in the MPEG-2 syntax, each Sequence header may be preceded by stuffing bits.

Figure 5B:
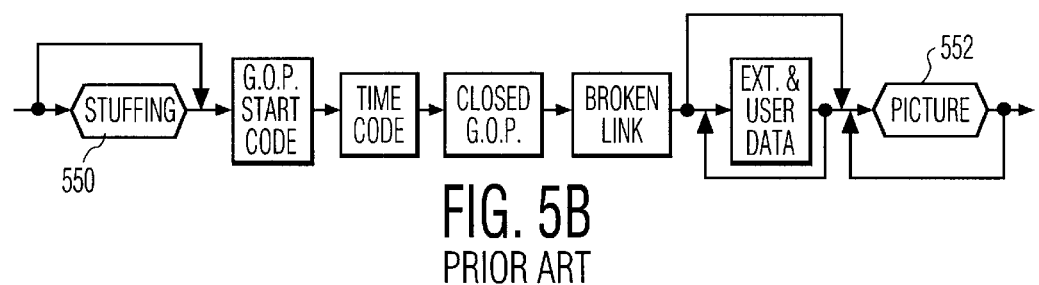
Figure 5C:
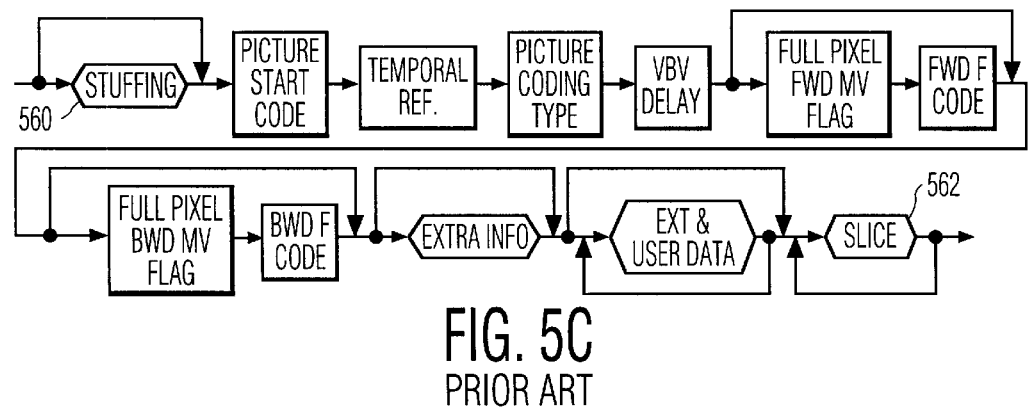
Figure 5D:
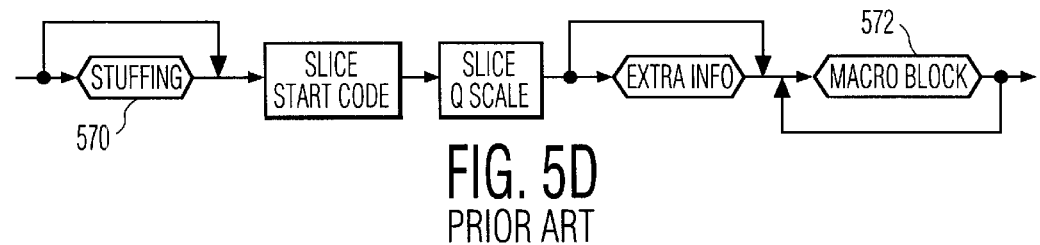
Figure 5E:
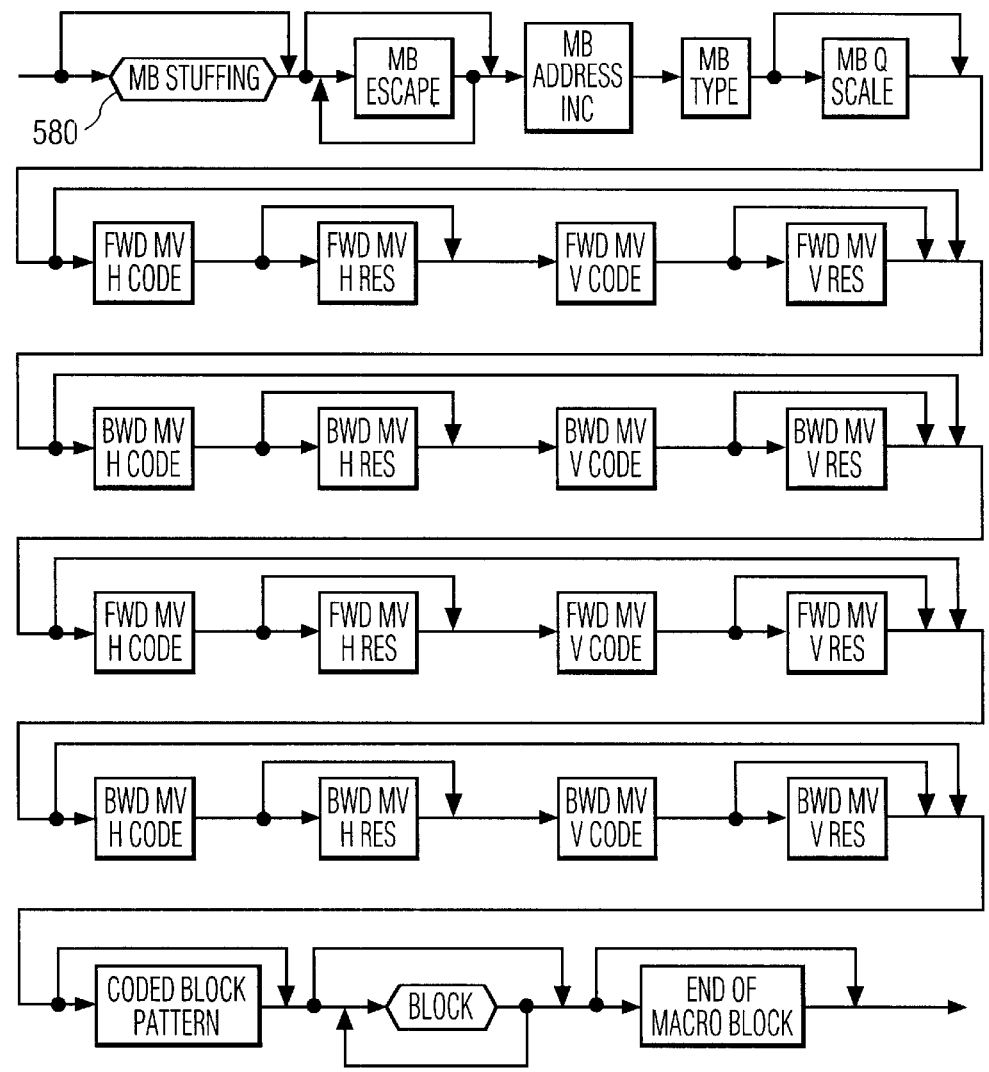
Figure 5F:
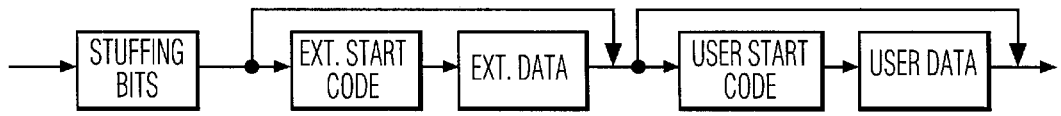

FIGS. 5B–5F illustrate other layers of the syntax. FIG. 5B represents the syntax of the Group of Pictures item 540l of FIG. 5A. FIG. 5B includes stuffing bits 550 and one or more Picture records 552, which are further defined by the syntax diagram of FIG. 5C. FIG. 5C, in turn, includes stuffing bits 560 and one or more Slice records 562. The Slice record is further defined by the syntax diagram of FIG. 5D. This Figure includes stuffing bits 570 and one or more Macroblock records 572. The Macroblock record is further defined by the syntax diagram of FIG. 5E and includes Macroblock stuffing data 580. These figures are not described in detail because the syntax is available in the above-referenced MPEG-2 specification document.

The apparatus shown in FIG. 4 allows a preset number of zeros to be passed to accommodate data in the bit-stream in which a string of zero-valued bytes form part of the header data or encoded image data. This includes at least 16 of the 23 zero-valued bits that form a start-code prefix and values in the Extension and User Data fields. Thus, for proper operation of the decoder, the minimum numbers of passed zero-valued bytes must be at least two for Slice records and may be, for example 128 for non-Slice records.

While the zero-valued byte count values held by the registers 432 and 434 are described above as corresponding to the maximum numbers of stuffing bytes that may follow a Slice record and a non-Slice record, respectively, the byte-count value held by the register 434 may be considered to be the number of bytes which may follow a Picture record. This is because there are many more Picture records than Group of Picture records or Sequence records. It is contemplated that other registers may be provided to hold zero-valued byte count values for other types of records. In addition it is contemplated that the start code detection engine may detect stop codes in addition to, or in place of start codes and adjust the count values appropriately.

Although the invention has been described in terms of an exemplary embodiment, it is contemplated that it may be practiced as outlined above within the scope of the appended claims.

What is claimed:

1. A video signal decoder which decodes signals that have been encoded according a stand (MPEG-2) specified by the moving pictures experts group (MPEG), the encoded video signal including a plurality of types of start codes and stuffing data, bursts of zero-valued bits, which are added to the encoded signal to provide the encoded signal as a fixed-rate bit-stream, the apparatus comprising:

a terminal for receiving the encoded video signal;

a zero-byte detector which monitors the received encoded video signal to identify individual zero-valued bytes;

a counter which counts the individual zero-valued bytes identified by the zero-byte detector to generate a count value, and compares the count value to a threshold value to identify stuffing data;

a start code identifier which monitors the received encoded video signal to identify start codes;

programming means, responsive to a type of start code identified by the start code identifier, for setting the threshold value; and means for blocking passage of ones of the zero-valued bytes in the sequence of is zero-valued bytes when the counter identifies the ones of the zero-valued bytes as stuffing data.

2. Apparatus according to claim 1, wherein the programming means sets a first threshold value when start code identifier identifies start codes which correspond to a Slice type of start code and sets a second threshold value, different from the first threshold value when the start code identifier identifies start codes which correspond to a type of start code other than a Slice type of start code.

3. Apparatus according to claim 2, wherein the programming means sets the counter to count-a predetermined number when a Slice-type start code is detected to identify a sequence of zero-valued bytes as stuffing bytes when the sequence has a number of bytes greater than the predetermined number and sets the counter to count a further predetermined member, different from said predetermined number when one of the other Start code is detected to identify a further sequence of zero-valued bytes as stuffing bytes when the further sequence has a number of bytes greater than the further predetermined number.

4. Apparatus according to claim 3, wherein the programming means includes first and second registers coupled to a microprocessor to receive the predetermined number and the further predetermined number, wherein the microprocessor may be controlled to change the predetermined number or the further predetermined number.

5. A method for reducing memory accesses in a video signal decoder which decodes signals that have been encoded according a standard (MPEG-2) specified by the moving pictures experts group (MPEG), the encoded video signal including a plurality of types of start codes and stuffing data, bursts of zero-valued bits which are added to the encoded signal to provide the encoded signal as a fixed-rate bit-stream, the method comprising the steps of:

receiving the encoded video signal;

monitoring the received encoded video signal to identify individual zero-valued bytes;

counting the individual zero-valued bytes identified by the zero-byte detector to generate a count value;

comparing the count value to a threshold value to identify staffing data;

identifying start codes in the received encoded video signal; and setting the threshold value responsive to an identified type of start code, and blocking passage of ones of the zero-valued bytes in the sequence of zero-valued bytes when the counter determines that the sequence of zero-valued bytes corresponds to stuffing data.

6. A method according to claim 5, wherein the step of setting the threshold value responsive to the identified type of start code sets the threshold value to a first value when the identified type of start codes correspond to a Slice type of start code and sets the threshold value to a second value, different from the first value when the identified type of start code correspond to a type of start code other than a Slice type of start code.

7. A method according to claim 6, wherein the method further includes the step of setting the counter value to a predetermined number when a Slice-type start code is detected to identify a sequence of zero-valued bytes as staffing bytes when the sequence has a number of bytes greater than the predetermined number and setting the counter value to a further predetermined number, different from said predetermined number, when one of the other start codes is detected to identify a further sequence of zero-valued bytes as stuffing bytes only when the further sequence has a number of bytes greater than the further predetermined number.

* * * * *